US011838685B2

(12) United States Patent
Hodge et al.

(10) Patent No.: US 11,838,685 B2
(45) Date of Patent: Dec. 5, 2023

(54) SECURE VIDEO VISITATION SYSTEM

(71) Applicant: **Global Tel*Link Corporation**, Reston, VA (US)

(72) Inventors: Stephen L. Hodge, Aubrey, TX (US); Anthony Bambocci, Altoona, PA (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 17/875,968

(22) Filed: Jul. 28, 2022

(65) Prior Publication Data
US 2023/0009952 A1 Jan. 12, 2023

Related U.S. Application Data

(63) Continuation of application No. 17/150,784, filed on Jan. 15, 2021, now Pat. No. 11,405,583, which is a
(Continued)

(51) Int. Cl.
*H04N 7/14* (2006.01)
*H04M 3/38* (2006.01)
(Continued)

(52) U.S. Cl.
CPC ............... *H04N 7/147* (2013.01); *G07C 9/37* (2020.01); *H04L 65/1059* (2013.01);
(Continued)

(58) Field of Classification Search
CPC ..... H04L 65/1069; H04M 3/38; H04M 3/382; H04M 2201/50; H04M 3/385; H04N 7/142; H04N 7/147
(Continued)

(56) References Cited

U.S. PATENT DOCUMENTS 4,360,827 A 10/1982 Braun
4,965,819 A 10/1990 Kannes
(Continued)

FOREIGN PATENT DOCUMENTS

CA 2845843 A1 9/2014

OTHER PUBLICATIONS

Bowyer et al., "A survey of approaches and challenges in 3D and multi-modal 3D+2D face recognition," Computer Vision and Image Understanding, vol. 101, No. 1, 2006; pp. 1-15.
(Continued)

*Primary Examiner* — Melur Ramakrishnaiah
(74) *Attorney, Agent, or Firm* — Sterne, Kessler, Goldstein & Fox P.L.L.C.

(57) ABSTRACT

Video conferencing in a controlled environment facility entails significant security concerns. These concerns are even more prevalent in a system that permits residents of such facilities to communicate via their own personal devices. Therefore, in order to alleviate these concerns and provide a secure system in which a resident is able to make video calls using their personal device, a kiosk unit is provided to which the personal device must be linked for completing a video call. When making the video call, the camera and display on the personal device are disabled, and all video data is captured and displayed by the kiosk unit. The link between the kiosk unit and the personal device facilitates the exchange of the image information for transmission to the outside party, or display to the user. By providing a fixed camera, and disabling the personal device camera, security can be maintained while permitting video calling services.

20 Claims, 7 Drawing Sheets

Related U.S. Application Data continuation of application No. 16/432,570, filed on Jun. 5, 2019, now Pat. No. 10,897,596, which is a continuation of application No. 15/621,676, filed on Jun. 13, 2017, now Pat. No. 10,321,094, which is a continuation of application No. 15/002,073, filed on Jan. 20, 2016, now Pat. No. 9,681,097.

(51) Int. Cl.
*H04L 65/1069* (2022.01)
*H04L 65/1059* (2022.01)
*G07C 9/37* (2020.01)

(52) U.S. Cl.
CPC .......... *H04L 65/1069* (2013.01); *H04M 3/38* (2013.01); *H04N 7/142* (2013.01); *H04M 3/382* (2013.01); *H04M 3/385* (2013.01); *H04M 2201/50* (2013.01)

(58) Field of Classification Search
USPC ............................................ 348/14.01–14.16
See application file for complete search history.

(56) References Cited

U.S. PATENT DOCUMENTS

| | | |
|---|---|---|
| 4,994,908 A | 2/1991 | Kuban et al. |
| 5,541,639 A | 7/1996 | Takatsuki et al. |
| 5,553,609 A | 9/1996 | Chen et al. |
| 5,559,875 A | 9/1996 | Bieselin et al. |
| 5,589,873 A | 12/1996 | Natori et al. |
| 5,589,878 A | 12/1996 | Cortjens et al. |
| 5,642,156 A | 6/1997 | Saiki |
| 5,719,928 A | 2/1998 | Pinnell et al. |
| 5,781,731 A | 7/1998 | Koreeda et al. |
| 5,841,469 A | 11/1998 | Freeman et al. |
| 5,848,132 A | 12/1998 | Morley et al. |
| 5,852,466 A | 12/1998 | Komine et al. |
| 5,961,446 A | 10/1999 | Beller et al. |
| 5,978,363 A | 11/1999 | Dimitrijevic et al. |
| 5,999,208 A | 12/1999 | McNerney et al. |
| 6,009,169 A | 12/1999 | Styron |
| 6,163,798 A | 12/2000 | Frank |
| 6,181,789 B1 | 1/2001 | Siegmund et al. |
| 6,192,118 B1 | 2/2001 | Bayless et al. |
| 6,195,117 B1 | 2/2001 | Miyazaki |
| 6,205,716 B1 | 3/2001 | Peltz |
| 6,219,640 B1 | 4/2001 | Basu et al. |
| 6,275,251 B1 | 8/2001 | Hartman et al. |
| 6,734,900 B2 | 5/2004 | Mayhew |
| 6,879,828 B2 | 4/2005 | Virtanen et al. |
| 7,027,659 B1 | 4/2006 | Thomas |
| 7,046,779 B2 | 5/2006 | Hesse |
| 7,061,521 B2 | 6/2006 | Bulriss et al. |
| 7,085,359 B2 | 8/2006 | Crites et al. |
| 7,106,843 B1 | 9/2006 | Gainsboro et al. |
| 7,256,816 B2 | 8/2007 | Profanchik et al. |
| 7,436,988 B2 | 10/2008 | Zhang et al. |
| 7,899,167 B1 | 3/2011 | Rae |
| 7,911,513 B2 | 3/2011 | Garrison et al. |
| 8,218,829 B2 | 7/2012 | Kenoyer |
| 8,370,206 B2 | 2/2013 | Collins |
| 8,489,887 B1 | 7/2013 | Newman et al. |
| 8,620,711 B2 | 12/2013 | Tor et al. |
| 8,917,848 B2 | 12/2014 | Torgersrud et al. |
| 8,929,525 B1 | 1/2015 | Edwards |
| 9,007,420 B1 | 4/2015 | Passe |
| 9,007,425 B1 | 4/2015 | Simon |
| 9,064,257 B2 | 6/2015 | Beigi |
| 9,065,971 B2 | 6/2015 | Verthein et al. |
| 9,083,850 B1 | 7/2015 | Higgs |
| 9,094,569 B1 | 7/2015 | Humphries |
| 9,106,789 B1 | 8/2015 | Shipman et al. |
| 9,232,051 B2 | 1/2016 | Torgersrud et al. |
| 9,300,790 B2 | 3/2016 | Gainsboro et al. |
| 9,420,094 B1 | 8/2016 | Keiser et al. |
| 9,558,523 B1 | 1/2017 | Hodge |
| 9,615,060 B1 | 4/2017 | Hodge |
| 9,661,272 B1 | 5/2017 | Daniel |
| 9,681,097 B1 | 6/2017 | Hodge et al. |
| 9,774,826 B1 | 9/2017 | Hodge |
| 10,321,094 B2 | 6/2019 | Hodge et al. |
| 10,897,596 B2 | 1/2021 | Hodge et al. |
| 11,405,583 B2 | 8/2022 | Hodge et al. |
| 2003/0174826 A1 | 9/2003 | Hesse |
| 2006/0087555 A1 | 4/2006 | Boyd et al. |
| 2006/0259755 A1 | 11/2006 | Kenoyer |
| 2007/0071206 A1 | 3/2007 | Gainsboro et al. |
| 2008/0120707 A1 | 5/2008 | Ramia |
| 2008/0201158 A1 | 8/2008 | Johnson et al. |
| 2009/0181716 A1 | 7/2009 | Benco et al. |
| 2011/0096138 A1 | 4/2011 | Grimshaw |
| 2011/0194488 A1 | 8/2011 | Kuo et al. |
| 2011/0249073 A1 | 10/2011 | Cranfill et al. |
| 2011/0273526 A1* | 11/2011 | Mehin ................. H04L 65/1069 709/227 |
| 2012/0092437 A1* | 4/2012 | Kim .................... H04L 65/1095 348/14.02 |
| 2012/0262271 A1 | 10/2012 | Torgersrud et al. |
| 2012/0281058 A1 | 11/2012 | Laney et al. |
| 2013/0106976 A1 | 5/2013 | Chu et al. |
| 2013/0179949 A1 | 7/2013 | Shapiro |
| 2013/0263227 A1* | 10/2013 | Gongaware ......... H04L 65/1069 726/4 |
| 2013/0332509 A1 | 12/2013 | Schwartz et al. |
| 2014/0218466 A1 | 8/2014 | Bloms et al. |
| 2014/0267547 A1 | 9/2014 | Torgersrud et al. |
| 2014/0273929 A1 | 9/2014 | Torgersrud |
| 2014/0282898 A1 | 9/2014 | Torgersrud |
| 2014/0313275 A1 | 10/2014 | Gupta et al. |
| 2015/0097919 A1* | 4/2015 | Karimi-Cherkandi ...................... H04W 52/027 348/14.07 |
| 2015/0186895 A1 | 7/2015 | Chauhan et al. |
| 2015/0189227 A1 | 7/2015 | Du et al. |
| 2015/0294382 A1 | 10/2015 | Alsina et al. |
| 2015/0334562 A1 | 11/2015 | Perold et al. |
| 2016/0078281 A1 | 3/2016 | Gongaware et al. |
| 2016/0119580 A1 | 4/2016 | Torgersrud |
| 2016/0125685 A1 | 5/2016 | Odisho |
| 2016/0139782 A1* | 5/2016 | Scott .................... G06F 3/04847 715/756 |
| 2016/0239932 A1 | 8/2016 | Sidler et al. |
| 2017/0083790 A1 | 3/2017 | Risinger et al. |
| 2017/0104958 A1 | 4/2017 | Farrell et al. |
| 2017/0132468 A1 | 5/2017 | Mosher et al. |
| 2017/0236228 A1 | 8/2017 | Hodge et al. |
| 2017/0280100 A1 | 9/2017 | Hodge |
| 2017/0289498 A1 | 10/2017 | Hodge et al. |

OTHER PUBLICATIONS

Cartoux et al., "Face Authentication or Recognition by Profile Extraction from Range Images," IEEE Proceedings of the Workshop on Interpretation of 3D Scenes, Nov. 1989; pp. 194-199.

Copyright Registration Record for "iPhone: The Missing Manual," 6th ed., 2012; 1 page.

DSKeye Gigabit Product Brief, Bitec Ltd. 2007; 2 pages.

Excerpts from "iPhone: The Missing Manual," 6th ed., Sebastopol, CA: O'Reilly Media, 2012; 61 pages.

Felsberg, "Robot Vision Systems, PhD course spring term 2015," Computer Vision Laboratory PowerPoint Presentation, 2015; 23 pages.

Gotsopoulos et al., "Remote Controlled DSP Based Image Capturing and Processing System Featuring Two-Axis Motion," Proceedings of the 4th European DSP in Education and Research Conference, Dec. 1-2, 2010; pp. 32-36.

Hjelmas et al., "Face Detection: A Survey," Computer Vision and Image Understanding, vol. 83, No. 3, Sep. 2001; pp. 236-274.

Huang et al., "Face Detection and Smile Detection," Proceedings of IPPR Conference on Computer Vision, Graphics, and Image Processing, Shitou, Taiwan, A5-6, 2009; 8 pages.

(56) References Cited

OTHER PUBLICATIONS

International Search Report and Written Opinion directed to International Patent Application No. PCT/US2017/014746, dated Mar. 21, 2017; 14 pages.
International Search Report and Written Opinion directed to International Patent Application No. PCT/US2017/017465, dated May 4, 2017; 14 pages.
International Search Report and Written Opinion directed to International Patent Application No. PCT/US17/14129, dated Feb. 17, 2017; 10 pages.
Kirby et al., "Application of the Karhunen-Loeve Procedure for the Characterization of Human Faces,", IEEE Transactions on Pattern Analysis and Machine Intelligence, vol. 12, No. 1, Jan. 1990; pp. 103-108
Lopez, "Local Binary Patterns Applied to Face Detection and Face Recognition," Final Research Project, Universitat Politecnica de Catalunya, Nov. 2010; 146 pages.
Mazda et al., The Focal Illustrated Dictionary of Telecommunications, 1999; p. 555.
Prosecution History of U.S. Pat. No. 8,929,525, U.S. Appl. No. 14/323,582, filed July 3, 2014.
Toderici et al., "Bidirectional relighting for 3D-aided 2D Face Recognition," Proceedings from IEEE Computer Vision and Pattern Recognition, Jun. 13-18, 2010, San Francisco, CA; pp. 258-274.
Turk et al., "Eigenfaces for Recognition," Journal of Cognitive Neuroscience, vol. 3, No. 1, 1991; pp. 71-86.
U.S. Appl. No. 61/801,861, filed Mar. 15, 2013; 77 pages.
Viola et al., "Rapid Object Detection Using a Boosted Cascade of Simple Features," Computer Vision and Pattern Recognition, 2001; pp. I-511-I-518.
Yang et al., "Detecting Faces in Images: A Survey," IEEE Transactions on Pattern Analysis and Machine Intelligence, vol. 24, No. 1, Jan. 2002, pp. 34-58.
Zhang et al., "A Survey of Recent Advances in Face Detection," Microsoft Research Technical Report No. MSR-TR-2010-66, Microsoft Corporation, 2010.
International Preliminary Report on Patentability, directed to related International Patent Application No. PCT/US2017/014129, dated Jul. 24, 2018; 6 pages.
Supplementary European Search Report, directed to related European Patent Application No. EP17741924, dated Aug. 1, 2019; 8 pages.

\* cited by examiner

SECURE VIDEO VISITATION SYSTEM

CROSS-REFERENCE TO RELATED APPLICATIONS

This application is a Continuation Application of U.S. application Ser. No. 17/150,784, filed Jan. 15, 2021, which is a Continuation Application of U.S. application Ser. No. 16/432,570, filed Jun. 5, 2019, now U.S. Pat. No. 10,897,596, issued Jan. 19, 2021, which is a Continuation Application of U.S. application Ser. No. 15/621,676, filed Jun. 13, 2017, now U.S. Pat. No. 10,321,094, issued Jun. 11, 2019, which is a Continuation Application of U.S. application Ser. No. 15/002,073, filed Jan. 20, 2016, now U.S. Pat. No. 9,681,097, issued Jun. 13, 2017, each of which is incorporated herein in its entirety.

BACKGROUND

Field

The disclosure relates to video communications, and specifically to video communications implemented via an inmate personal device in a controlled environment facility.

Related Art

American prisons house millions of individuals in controlled environments all over the country. The rights of these prisoners are largely restricted for a number of reasons, such as for their safety and the safety of others, the prevention of additional crimes, as well as simple punishment for crimes committed. However, these prisoners are still entitled to a number of amenities that vary depending on the nature of their crimes. Such amenities may include phone calls, commissary purchases, access to libraries, digital media streaming, as well as others.

One such amenity that is currently in the process of being provided to inmates of correctional facilities is that of video conferencing, also known as video calling. However, like with all such services, video conferencing services present a number of challenges that are unique to prisons.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
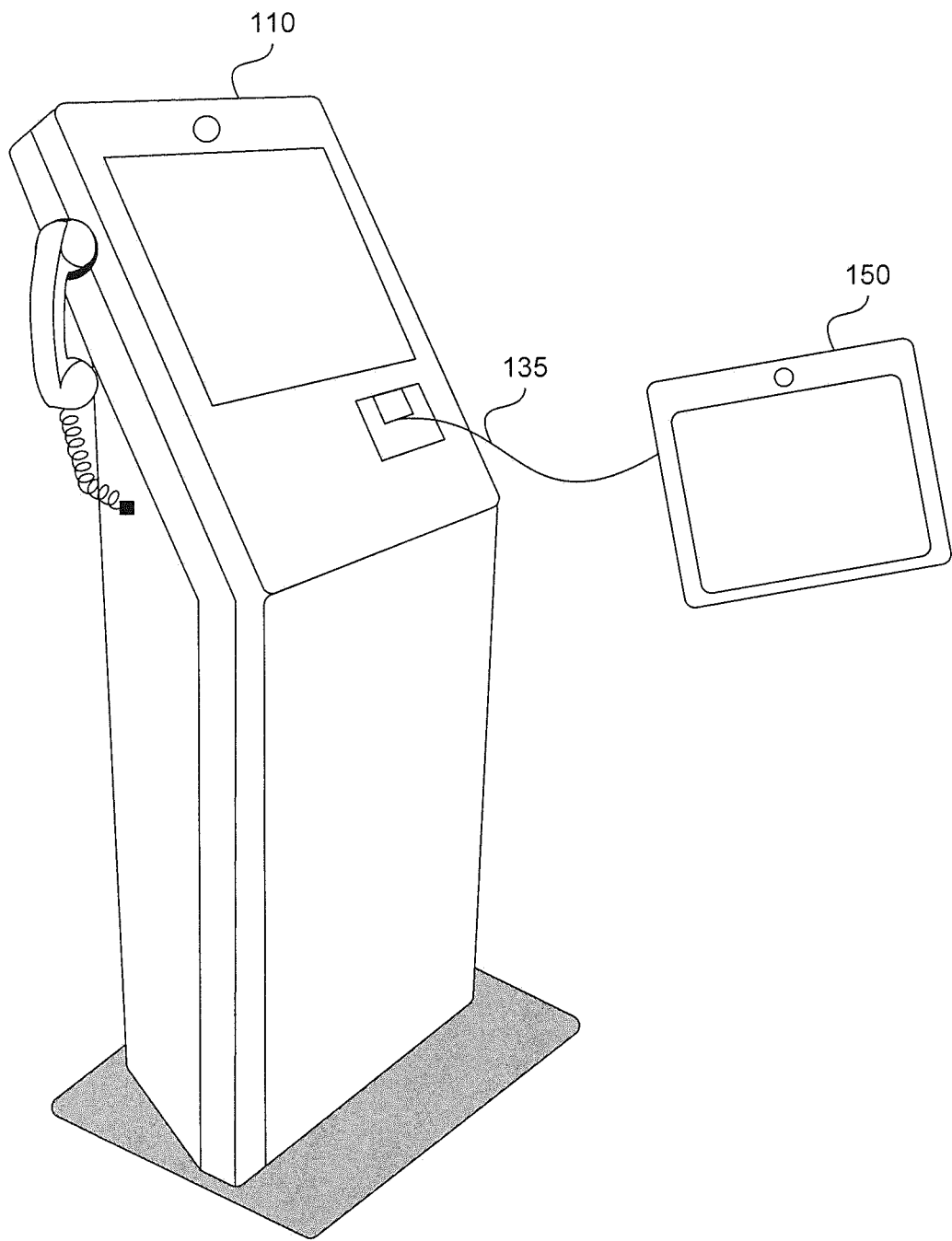
FIG. 1 illustrates an exemplary video conferencing environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

Embodiments may be implemented in hardware (e.g., circuits), firmware, computer instructions, or any combination thereof. Embodiments may be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, or other hardware devices Further, firmware, routines, computer instructions may be described herein as performing certain actions. However, it should be appreciated that such descriptions are merely for convenience and that such actions in fact results from computing devices, processors, controllers, or other devices executing the firmware, routines, instructions, etc. Further, any of the implementation variations may be carried out by a general purpose computer, as described below.

For purposes of this discussion, the term "module" shall be understood to include at least one of hardware (such as one or more circuit, microchip, processor, or device, or any combination thereof), firmware, computer instructions, and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many different communications protocols, and is not limited to video communications.

As previous discussed, there are many unique concerns associated with providing video communications to inmates of a controlled facility. To further complicate matters, it is preferable to provide video communications to inmates via personal inmate devices (PIDs). In other words, certain facilities may be outfitted to allow inmates to carry and use their own personal devices, in the form of tablet computers, smartphones, etc. that they are permitted to use for personal calls, digital content streaming, among other uses.

However, attempting to utilize inmate PIDs for video calling creates significant security concerns that are additional to the already numerous security complications associated with simple audio telephone calls. For example, the use of video in the call can allow outsiders to provide detailed prohibited visual information to inmates in the form of pictures, schematics, video instructions, etc. Further, inmates would also be in a position to transmit prohibited information to outsiders such as prison layouts (via a visual scan, e.g.), guard or other inmate identities, and sexual content, among others.

With these concerns in mind, it is preferable to disable the camera on the PID so that control of the view being provided to outsiders is removed from the inmate. By providing a fixed camera, the prison (and not the inmate) control a substantial portion of the information being provided to outsiders. With this objective in mind, the following description is provided of a system in which an inmate PID functions together with a fixed camera to provide secure video communications to inmates.

An Exemplary Video Conferencing Environment

FIG. 1 illustrates an exemplary video conferencing environment 100. In the environment 100, a kiosk unit 110 disposed at a particular location. In an embodiment, the kiosk unit 110 is disposed at a predetermined location, such as a facility telephone bay, or a more private conference room. In the former arrangement, the kiosk unit 110 may be arranged with other kiosk units and/or telephone units as part of a public calling area. In either arrangement, the communications will be closely monitored.

In an embodiment, the kiosk unit 110 has a fixed orientation, such that a camera of the kiosk unit 110 captures a fixed location for transmission. This is the most restrictive configuration, and is designed to provide maximum protection against the transmission of unauthorized visual data transmissions. In an alternative embodiment, the kiosk unit 110 and/or the camera is pivotable along the horizontal plane. In such an embodiment, the degree of pivot is restricted to a relatively small amount to provide moderate protection against the transmission of unauthorized visual data transmissions. In still another embodiment, the kiosk unit 110 or the camera can be freely movable. This embodiment is discussed in further detail below.

The kiosk unit 110 includes an interface connection 135 that provides a communication interface to a Personal Inmate Device 150. As discussed above, the PID 150 can be any portable device assigned to a particular prisoner to provide certain electronic services, such as telephone and commissary services, to that particular prisoner. Using the interface communication 135, the PID 150 cooperatively operates with the kiosk unit 110 to provide video communication services for the inmate, as will be discussed in further detail below.

Exemplary Kiosk Unit

Figure 2A:
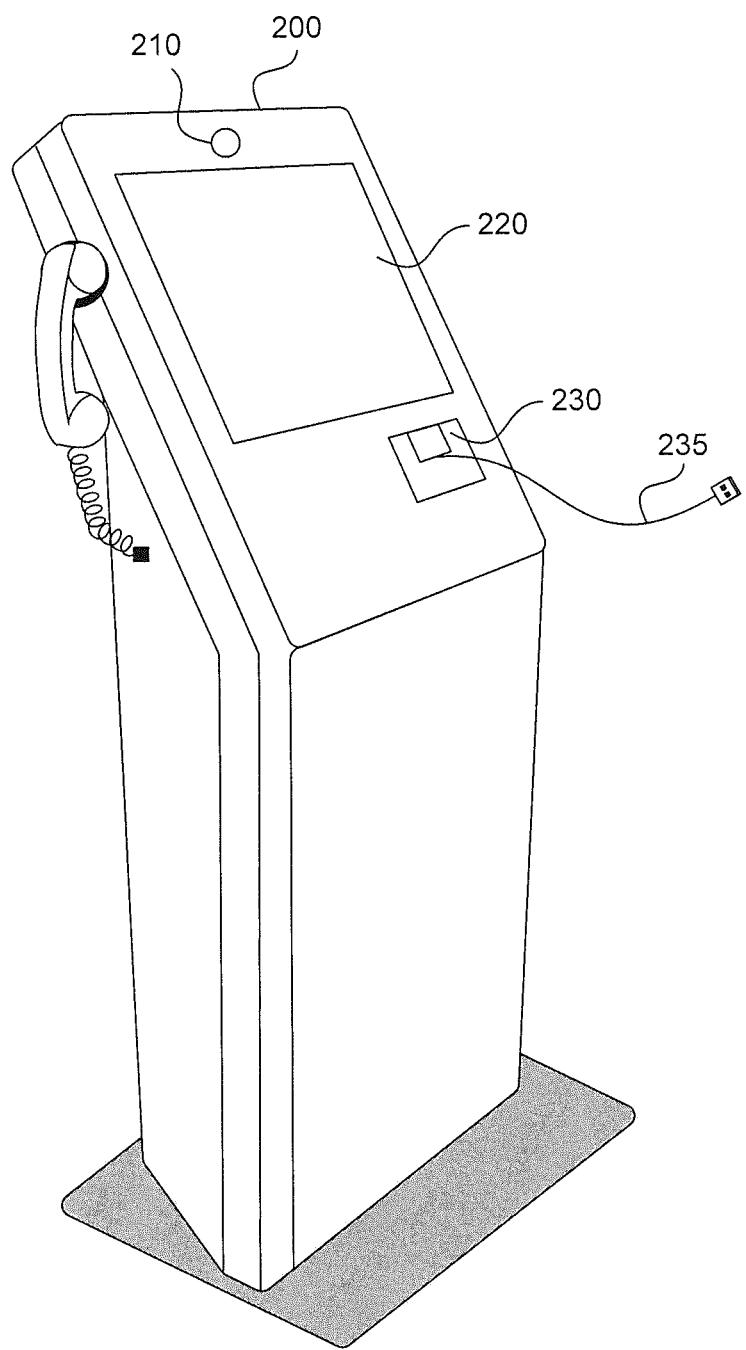
FIG. 2A illustrates a perspective view of an exemplary video conferencing kiosk.

FIG. 2A illustrates a perspective view of an exemplary video conferencing kiosk 200. The kiosk 200 includes at least a camera 210 and a display 220. In an embodiment, the kiosk 200 also includes an interface port 230 and an interface connection 235, as will be discussed in further detail below. The kiosk 200 may represent an exemplary embodiment of the kiosk unit 110.

As shown in FIG. 2A, the kiosk 200 includes a camera 210 or other visual input device. The camera 210 captures visual information in the form of still and/or video images from the video conferencing environment 100 that will form the inmate's video transmissions. As discussed above, there are multiple embodiments for the positioning of the camera. There is, of course, a significant security concern associated with the capture of visual data from inside the correctional facility. And although this security concern takes precedence, it can nonetheless be balanced against the usefulness of the video conferencing kiosk.

With this balance in mind, in a preferred embodiment, the camera is mounted at a fixed position on the kiosk 200, but its focal direction can be vertically adjusted within a predetermined degree. To provide an example, the camera 210 is positioned 66 inches off the ground, and its focal direction can be adjusted 10 degrees from horizontal either up or down. Such a configuration enhances the usefulness of the kiosk by allowing it to compensate for the different heights of different individuals, while maintaining a high degree of visual security.

The kiosk 200 also includes a display 220. The display 220 is primarily used for displaying the incoming visual data received from the outside party to the call. However, in an embodiment, the display 220 is also used to display other information, such as status information, calling instructions, calling rules, warnings, etc. In an embodiment, the display also interfaces with the PID 150 to provide instructions to the inmate dictated from the PID, as will be discussed in further detail below.

As discussed above, the kiosk 200 also includes the interface port 230 and the interface connection 235. The interface port 230 is a communication port for interfacing with the PID 150. The interface port links to the PID 150 via the interface connection 235, and is used to send and receive information with the PID 150, as will be discussed in further detail below.

Figure 2B:
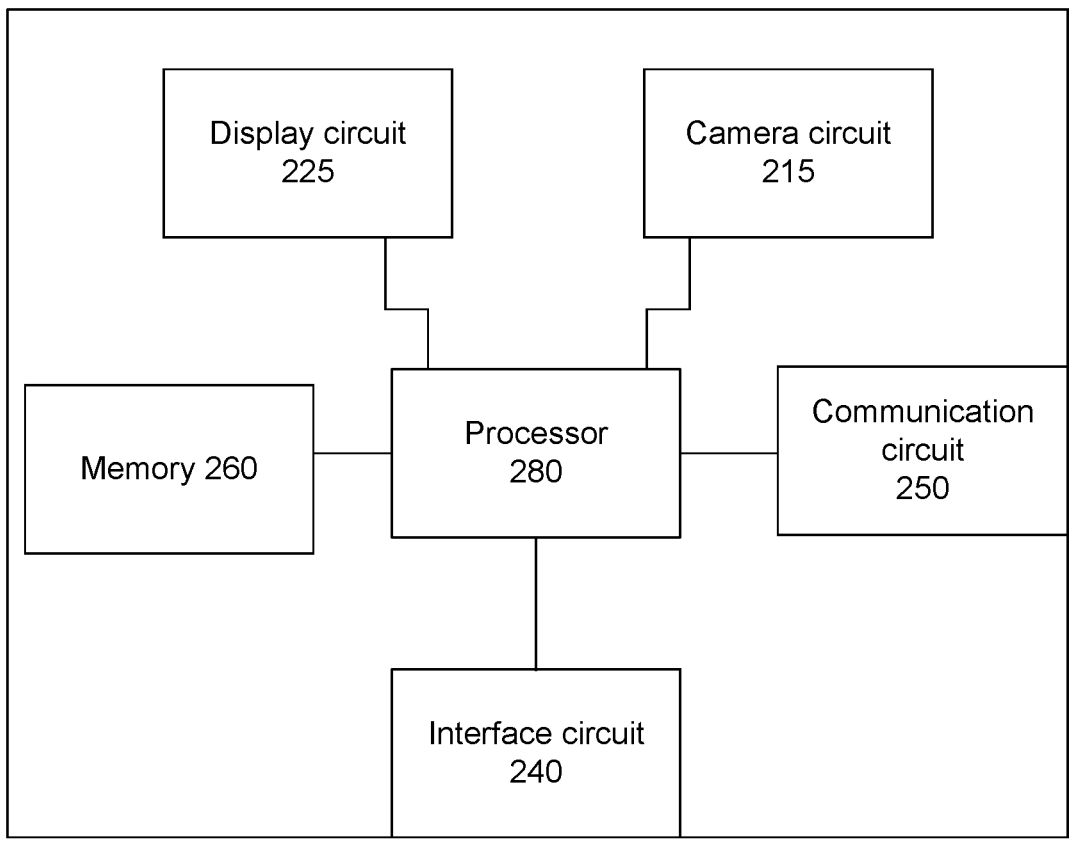
FIG. 2B illustrates a block diagram of an exemplary video conferencing kiosk.

FIG. 2B illustrates a block diagram of the exemplary video conferencing kiosk 200. As shown in FIG. 2B, the video conferencing kiosk 200 includes several operational components. The components include the camera circuit 215 that functionally supports the camera 210, and which may include one or more charge coupled device (CCD) or CMOS image sensor arrays, and a display circuit 225 that functionally supports the display 220, and which may include one or more display pixel arrays and driving circuits for displaying digital visual information.

The video conferencing kiosk 200 also includes a communication circuit 250 for communicating with a backhaul and/or central site server. The communication circuit 250 may communicate wirelessly using one or more radios, and/or over hardlines using coaxial, Ethernet, or fiberoptic communications. The communication circuit 250 performs the basic communications exchanges with the outside party to facilitate the audio/visual communication. The video conferencing kiosk 200 also includes an interface circuit 240 that functionally supports the interface port 230, and that communicates with the PID 150 and exchanges information therewith. The video conferencing kiosk 200 also includes a memory 260 that can be utilized for a variety of different functions, such as for the temporary storage of display information, program instructions, authentication information, etc.

A processor 280 performs the central control of the various components of the video conferencing kiosk 200, such as the execution of program instructions, the movement of data and instructions among the components and PID 150, as well as other general processing functions.

Exemplary Personal Inmate Device

Figure 3A:
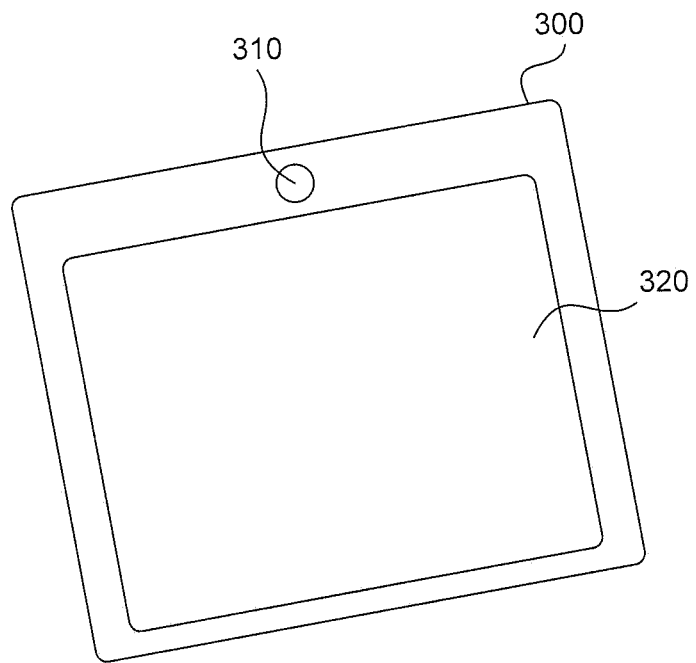
FIG. 3A illustrates a perspective view of an exemplary person inmate device.

FIG. 3A illustrates a perspective view of an exemplary personal inmate device 300. The PID 300 includes a display 320. In order to save costs, PIDs are typically not specifically constructed for prison use, but rather are physically modified or software-modified consumer devices, such as modified iPADs®, Kindle Fires®, or Android®—based tablet computers, among others. As such, the PID 300 often includes a camera 310, even though it may not be desirable to allow inmates personal access to a such a camera.

The PID 300 also includes some means for user input. Although the PID 300 can include a physical keyboard, the PID 300 will more typically provide input via its display 320 using a touchscreen interface. There may be other input mechanisms that will be known to a person of ordinary skill in the art.

Figure 3B:
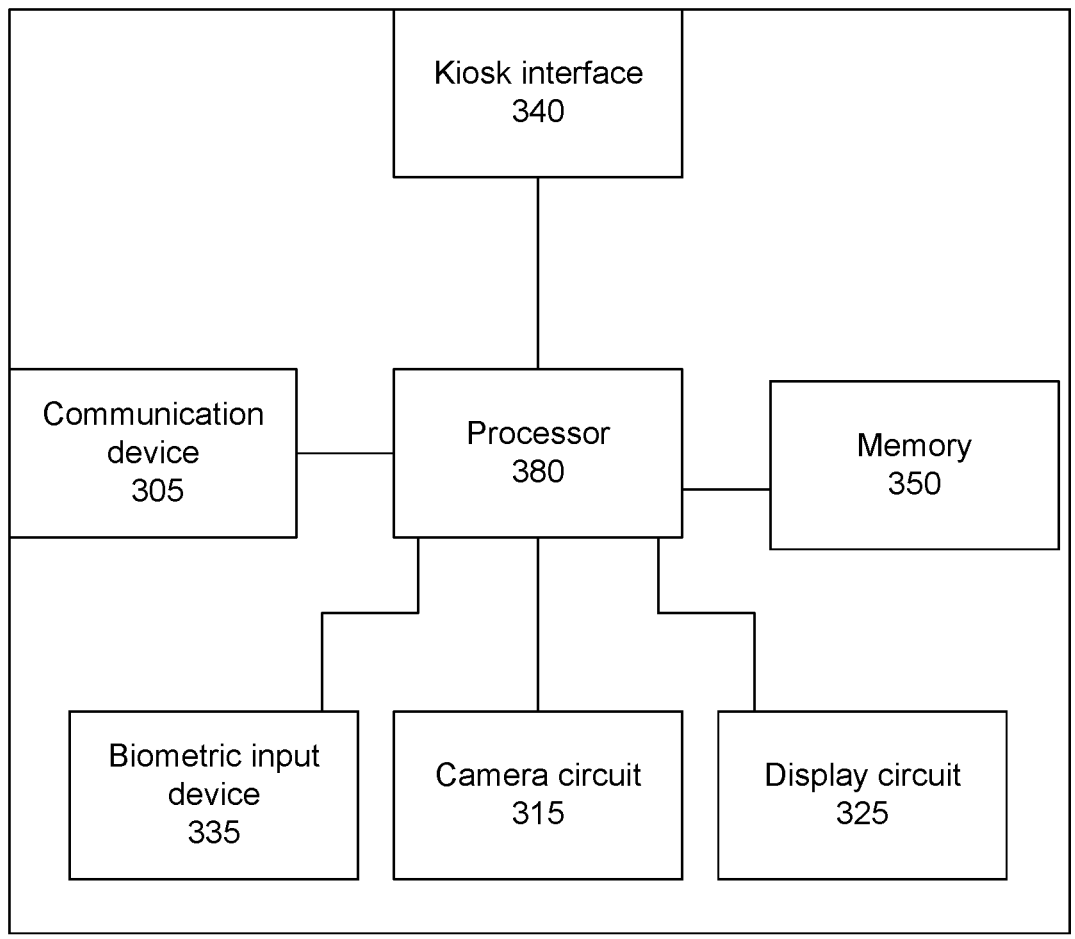
FIG. 3B illustrates a block diagram of an exemplary person inmate device.

FIG. 3B illustrates a block diagram of a personal inmate device that, in an embodiment, corresponds to the PID 300. As shown in FIG. 3B, the PID 300 includes a camera circuit 315 that functionally supports the camera 310, and that may include one or more CCD or CMOS image sensor arrays. The PID 300 also includes a display circuit 325 that drives display of image and/or video information to the display 320. In an embodiment, the display circuit 325 includes an array of display pixels for displaying digital image data.

In an embodiment, the PID 300 also includes a biometric input device 335. The biometric input device 335 may be any device capable of acquiring biometric data of a user. As such, the biometric device 335 may include a microphone for capturing voice data, a camera for capturing facial or eye information, a fingerprint scanner for obtaining fingerprint information, among others. Such biometric information is useful for authenticating the user of the PID in order to ensure it is being used by the person to whom it is assigned.

In an embodiment, the authentication is performed by the kiosk unit 200 directly. For example, in the case of facial recognition, the camera 210 and the camera circuit 215 capture the image data of the subjects face. The kiosk unit 200 then either performs the authentication of the user based on a facial comparison, or transmits the data to a central authentication server. In a further embodiment, the camera 210 of the kiosk unit 200 can include a plurality of cameras configured in a stereoscopic arrangement to allow for the capture of multiple images of the subject at slightly different orientations. The camera circuit 215 is then configured to render the captured images as a single stereoscopic 3-dimensional image. In this case, facial architecture comparisons can be performed as part of the authentication process, either by the kiosk itself or an authentication server. In another embodiment, the camera of the capturing device (e.g., either the kiosk unit 200 or the PID 300) can include infrared capabilities to allow for heat signature authentication.

The PID 300 also includes a communication device 305 for communicating with a backhaul and/or central site server. The communication device 305 preferably communicates wirelessly using one or more radios. The communication device 305 is capable of facilitating communicating between the PID 300 and an outside party via one or more communication servers. This configuration is particularly useful to the inmate for making personal telephone calls, where physical restrictions are not needed to the same degree as video communications. However, for video communications and other more high-security communication functions, communication can be facilitated by the kiosk interface 340. The kiosk interface 340 exchanges information, such as authentication information and/or communication data, with the kiosk unit 200.

The PID 300 also includes a memory 350 that can be utilized for a variety of different functions, such as for the temporary storage of display information, program instructions, authentication information, etc. A processor 380 performs the central control of the various components of the PID 300, such as the execution of program instructions, the movement of data and instructions among the components and kiosk unit 200, as well as other general processing functions.

Cooperative Video Calling

As discussed above, the purpose of the PID 300 is to provide the inmate with a number of personal services that the inmate can access from his cell during his/her own time. Such services can encompass any that don't require an elevated security level, such as a telephone call (which will typically be monitored, other than calls to the inmate's attorney or other such privileged communications), streaming services (which are highly regulated), or commissary services (which are very restricted). Therefore, when the PID 300 is used for performing any of these functions, the PID 300 can employ the use of its communication device 305 for communicating with the prison system.

However, when the inmate seeks to make a video call, a higher level of security is required. Thus, rather than allowing the inmate to use solely his PID 300 to carry out a video call, software on the device requires cooperative interactions with a video conferencing kiosk, such as video conferencing kiosk 300. The process for making a video call will now be described with respect to FIG. 4.

Figure 4:
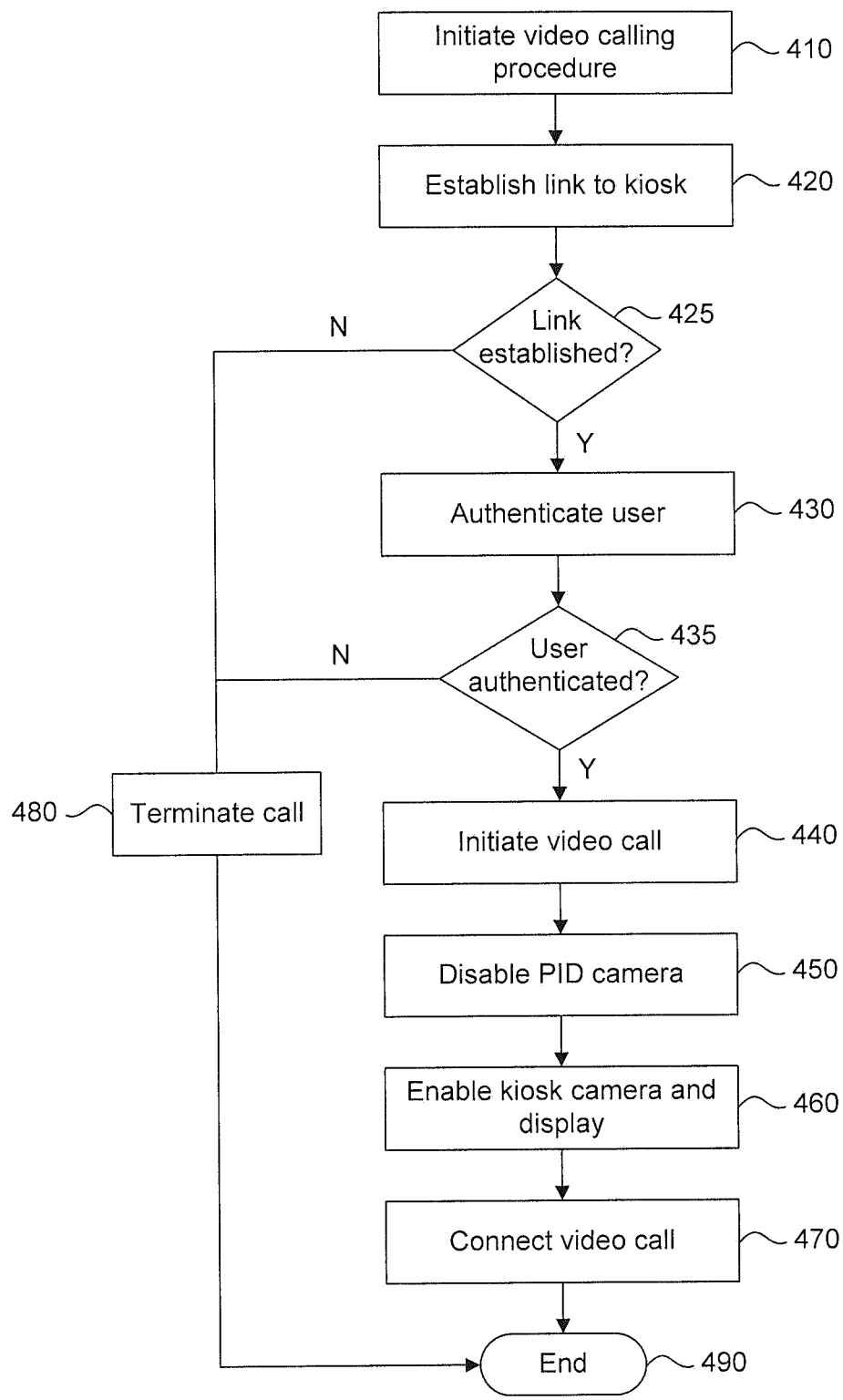
FIG. 4 illustrates a flowchart diagram of an exemplary method for completing a video call.

FIG. 4 illustrates a block diagram of an exemplary method for making a video call using the exemplary system.

As shown in FIG. 4, the method begins with a user of the PID 300 initiating a video calling procedure (410). This can occur in a variety of different ways in different embodiments. For example, in embodiments, the video call can be initiated by the user providing a particular input to the PID 300, such as the selection of an icon or the input of a command, by detecting a link to a video calling kiosk (such as by using plug-n-play detection, for example), or by inputting a particular command to an input device of the kiosk. Other means for initiating the video calling procedure and/or providing a command to perform the same will be apparent to a person of ordinary skill in the art.

Following the initiation of the video calling procedure, software on the PID 300 (or in the kiosk, depending on the location of video call initiation) verifies that a link has been established between the PID 300 and the kiosk unit 200

(420). Such a link may be verified by, for example, performing a handshake procedure with the kiosk unit 200. This handshake procedure may be carried out, for example, by transmitting a notification signal to the kiosk via the kiosk interface 340, the interface link 235, and the device interface 240, and receiving an acknowledgement or other reply signal in response via the same. Other means for verifying the link will be apparent to a person of ordinary skill in the art.

As part of the verification procedure, the verification algorithm determines whether the link has been established (425). This determination may be provide a predetermined amount of time or a number of attempts within which the link may be established before making a final determination regarding the link status. If the software determines that the link has not been established (425—N), then the call is terminated (480) and the method ends (490). If, on the other hand, the software determines that the link has been established, then the method proceeds. This verification step aids in security to ensure that the user is at the designated location, and is set up to utilize the kiosk unit 200 for carrying out the video call.

Upon determining that the link has been established, the software next carries out an authentication procedure (430). As part of this procedure, the PID 300 uses the biometric device 335 to capture biometric information of the user. In an embodiment, additional information, such as a PIN, credit card number, or other identifying information, can also be acquired from the user to enhance authentication. The PID 300 uses the acquired authentication information to verify the identity of the user. In an embodiment, the PID 300 communicates the authentication information to a central site server of the prison via its communication device 305. A comparison of the acquired information is made to stored information, and an authentication determination is transmitted back to the PID 300.

If the user is not authenticated (435—N), then the software terminates the video call (480) and the method ends (490). On the other hand, if the user is authenticated (435—Y), then the software initiates the video call (440). The initiation of the video call is preferably carried out by the kiosk unit 200 by receiving an input from the user identifying the party-to-be-called, and transmitting calling data to the central site server.

Several additional security steps may occur as part of the video calling procedure, which preferably take place at the central site server. These steps may include verifying that the inmate is permitted to call the outside party, verifying a sufficient balance in the inmate's account for completing the video call, etc.

In an embodiment, following the initiation of the video call, the control signals from the kiosk unit 200 cause the camera 310 of the PID 300 to become disabled. By disabling the camera 310 of the PID 300, the inmate will be unable to capture prohibited image data. The PID 300 can notify the kiosk unit 200 as to the disabling of the camera 310 using a verification or other notification signal. In other embodiments, this step may be accomplished in other ways, or may be disregarded altogether. For example, in an embodiment, the kiosk unit 200 can be configured to only process and/or transmit image information captured from its own camera 210. In another embodiment, an exchange protocol may be designed for communication between the kiosk 200 and the PID 300 that is particularly strict, and does not permit for the exchange of image data. Other embodiments may include any number of other means for ignoring the camera capture of the PID 300 and/or utilizing only the components of the kiosk 200 for capturing and transmitting image data.

Next, the camera 210 and the display 220 of the kiosk unit 200 are enabled (460). Once enabled, the camera 210 begins capturing image data within its field of view for transmission to the called party. Likewise, the display 220 begins displaying video information received from the called party. In some embodiments, the display 220 may also display additional information, such as that previously discussed.

Once enabled, the call can then be connected to the outside party for carrying out the video call (470). During the video call, in this embodiment, local voice and video data are captured by the kiosk unit and transmitted to the outside party via the central site server. Likewise, voice and video data from the outside party are transmitted to the kiosk unit 200 via the central site server to be displayed and output to the inmate.

By ensuring that the camera 310 of the PID 300 is either disabled or at least that its image capture information is prohibited from being used in the video call, the necessary security precautions to enable video calling using the PID 300 can be effected.

SECOND EMBODIMENT

Because the PID 300 and the kiosk unit 200 must be linked in order to carry out the video call, the functional operations that are performed to carry out the video call can be performed by the kiosk unit 200, by the PID 300, or shared between the two devices. For example, in an embodiment, because the PID 300 is already capable of independently communicating with the central site server (and thus outside callers), the system can be configured such that the video calling communications are also carried out by the PID 300. This embodiment is particularly useful to avoid duplicative hardware. In other words, because a radio or other communication hardware is already available in the PID 300, it is not needed in the kiosk 200, thus saving costs.

In this embodiment, it is particularly important to ensure that the PID 300 camera 310 is disabled prior to call completion (450) in order to ensure that the user is prevented from transmitting prohibited image data. In this embodiment, the kiosk unit 200 functions only to capture image data for transmission and display image data received from the outside party. This information is exchanged with the PID 300 via the kiosk interface 340, interface link 235 and the device interface 240.

In this embodiment, the kiosk unit 200 does not transmit or receive the communications data with the central site server. Rather, these functions are performed by the PID 300 itself. This adds an additional layer of security, because the central site server can perform device authentication on the inmate's PID 200 in the manner that is generally performed for regular voice calls. In this embodiment, during the call, the video data and preferably the voice data are captured by the kiosk unit 200. The kiosk unit 200 forwards this data to the PID 300 via the interface link 235. The PID 300 receives the data via its kiosk interface 340, and the processor 380 packetizes or otherwise prepares the data for transmission to the central site server via its communication device 305.

This embodiment can be particularly beneficial to reduce the expense and redundancy of the kiosk unit 200. And although allowing use of the inmate PID 300 for the video communication would otherwise raise security concerns, those concerns are largely alleviated by requiring the display and camera of the PID 300 to be disabled during the call.

Exemplary Computer System Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 5:
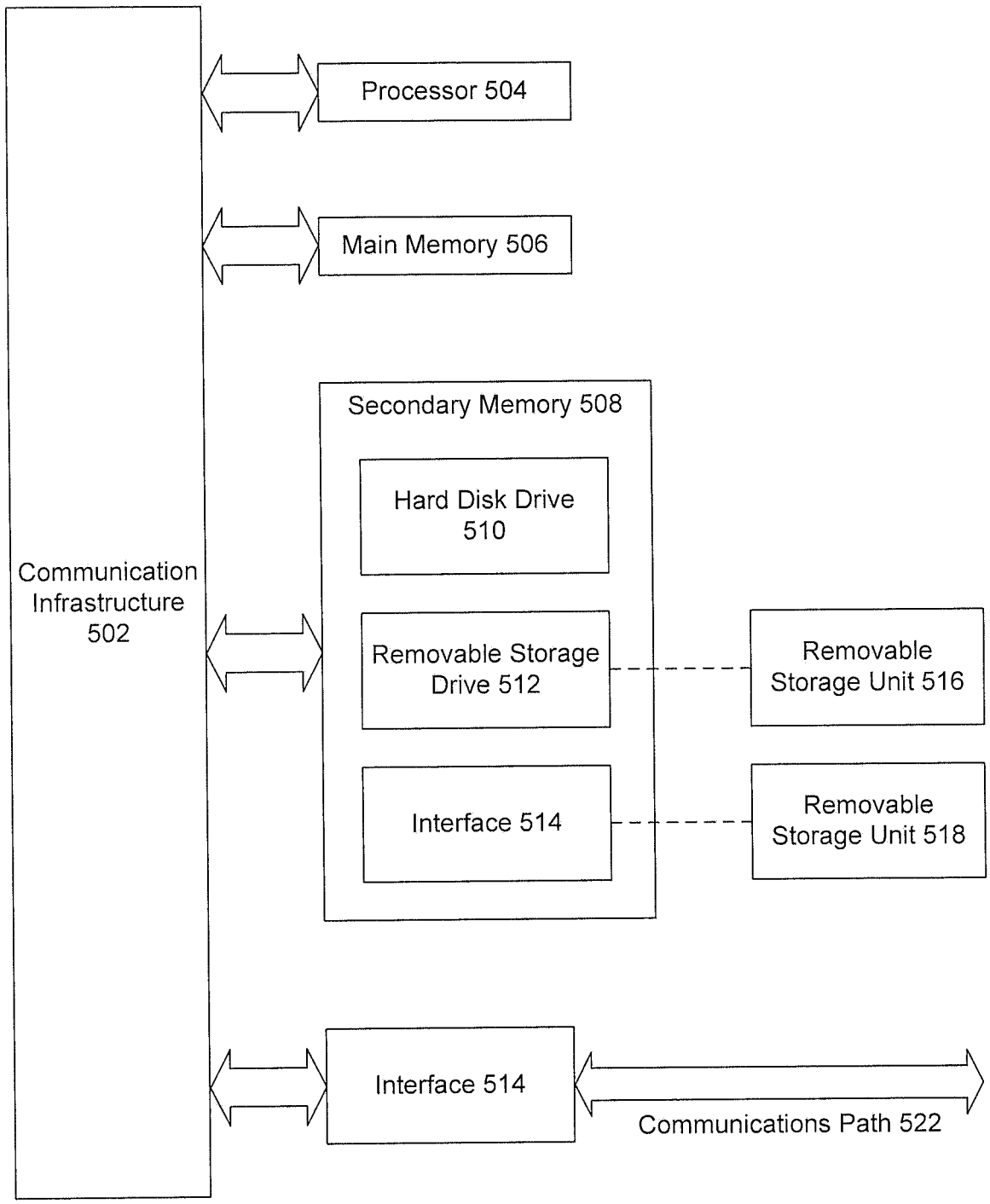
FIG. 5 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the method of flowcharts 400 can be implemented in the environment of one or more computer systems or other processing systems. An example of such a computer system 500 is shown in FIG. 5. One or more of the modules depicted in the previous figures can be at least partially implemented on one or more distinct computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCM-CIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure.

What is claimed is:

1. A wireless communication device for use in a controlled environment facility, comprising:
   a radio configured to wirelessly send and receive wireless signals;
   a connection port configured to receive a link communication cable and to exchange communication information via the link communication cable; and
   one or more processors configured to:
      receive a call initiation operation from a user, the call initiation operation being one of a video call initiation or a non-video call initiation;
      in response to the call initiation operation being the video call initiation:

verifying that the link communication cable is detected; and transmitting communication data via the connection port in response to the verifying; and in response to the call initiation operation being the non-video call initiation, transmitting communication data via the radio.

2. The wireless communication device of claim 1, wherein the one or more processors are further configured to:

in response to the call initiation operation being the video call initiation, establishing a call with a wireless communication terminal via the radio;

receive audio and video data of an outside user via the radio; and transmit the received audio and video data of the outside user to an external device via the link communication cable.

3. The wireless communication device of claim 2, further comprising:

an audio detection device;

a display device; and an audio output device, wherein the one or more processors are further configured to:

in response to the call initiation operation being the video call initiation, disable the audio detection device and the display device.

4. The wireless communication device of claim 2, wherein the one or more processors are further configured to:

in response to the call initiation operation being the video call initiation, receive audio and video data of the user from the external device via the link communication cable.

5. The wireless communication device of claim 4, wherein the one or more processors are further configured to cause the radio to wirelessly transmit the received audio and video data of the user to the wireless communication terminal.

6. The wireless communication device of claim 2, wherein the one or more processors are further configured to perform a handshake with the external device.

7. The wireless communication device of claim 6, wherein the handshake includes transmitting via the link communication cable user credentials to the external device.

8. A method for wirelessly communicating in a controlled environment facility, comprising:

receiving call initiation operation from a user, the call initiation operation being one of a video call initiation or a non-video call initiation;

in response to the call initiation operation being the video call initiation:

verifying a physical link is present; and transmitting communication data via the physical link in response to the verifying; and in response to the call initiation operation being the non-video call initiation, wirelessly transmitting communication data via a radio.

9. The method of claim 8, further comprising:

in response to the call initiation operation being the video call initiation, establishing a call with a wireless communication terminal via the radio;

receiving audio and video data of an outside user via the radio; and transmitting the received audio and video data of the outside user to an external device via the physical link.

10. The method of claim 9, further comprising:

disabling an audio detection device and a display device in response to the call initiation operation being the video call initiation.

11. The method of claim 9, further comprising receiving audio and video data of the user from the external device via the physical link in response to the call initiation operation being the video call initiation.

12. The method of claim 11, further comprising wirelessly transmitting, via the radio, the received audio and video data of the user to the wireless communication terminal.

13. The method of claim 9, further comprising performing a handshake with the external device.

14. The method of claim 13, wherein the handshake includes transmitting, via the physical link, user credentials to the external device.

15. A communication system, comprising:

a wireless communication device, comprising:

a radio configured to wirelessly send and receive wireless communication signals;

a first connection port configured to receive a link communication cable and to exchange communication information with an external device via the link communication cable; and one or more processors; and the external device comprising:

a second connection port configured to receive the link communication cable and to exchange communication information with the wireless communication device;

a display device; and an audio output device, wherein the one or more processors are configured to:

receive a call initiation operation from a user, the call initiation operation being a video call initiation;

verify that the link communication cable is connected between the connection port and the external device; and transmit communication data via the connection port to the external device.

16. The system of claim 15, wherein the one or more processors are further configured to:

establish a call with a wireless communication terminal via the radio;

receive audio and video data of an outside user via the radio; and transmit the received audio and video data of the outside user to the external device via the link communication cable.

17. The system of claim 16, wherein the wireless communication device further comprises:

an audio detection device;

a display device; and an audio output device, wherein the one or more processors are further configured to disable the audio detection device and the display device.

18. The system of claim 16, wherein the one or more processors are further configured to receive audio and video data of the user from the external device via the link communication cable.

19. The system of claim 18, wherein the one or more processors are further configured to cause the radio to wirelessly transmit the received audio and video data of the user to the wireless communication terminal.

20. The system of claim 16, wherein the one or more processors are further configured to perform a handshake with the external device.

* * * * *

UNITED STATES PATENT AND TRADEMARK OFFICE
CERTIFICATE OF CORRECTION

| | |
|---|---|
| PATENT NO. | : 11,838,685 B2 |
| APPLICATION NO. | : 17/875968 |
| DATED | : December 5, 2023 |
| INVENTOR(S) | : Hodge et al. |

It is certified that error appears in the above-identified patent and that said Letters Patent is hereby corrected as shown below:

In the Claims

In Column 11, Claim 8, Line 48, after "receiving", insert -- a --.

Signed and Sealed this
Thirteenth Day of February, 2024

Katherine Kelly Vidal
*Director of the United States Patent and Trademark Office*